United States Patent [19]
Paisley et al.

[11] Patent Number: 5,399,323
[45] Date of Patent: Mar. 21, 1995

[54] METHOD FOR IMPROVING REDUCING POTENTIAL OF NATURAL GAS FEED

[75] Inventors: Mark A. Paisley; Kenneth D. Pugsley, both of Columbus, Ohio

[73] Assignee: Gas Research Institute, Chicago, Ill.

[21] Appl. No.: 60,738

[22] Filed: May 11, 1993

[51] Int. Cl.$^6$ .................. C01B 17/20; C01B 17/44
[52] U.S. Cl. .................. 423/170; 423/519.2; 423/566
[58] Field of Search .......... 423/170, 638, 541 R, 423/541.1, 511, 566, 566.3, 519.2

[56] References Cited

U.S. PATENT DOCUMENTS

| | | |
|---|---|---|
| 1,457,436 | 6/1923 | Howard et al. ............... 23/137 |
| 3,260,035 | 7/1966 | Wheelock et al. ............ 423/170 |
| 3,582,276 | 6/1971 | Campbell et al. ............. 23/177 |
| 3,607,036 | 9/1971 | Foecking et al. ............. 23/177 |
| 3,607,045 | 9/1971 | Wheelock et al. ............ 23/186 |
| 3,640,682 | 2/1972 | Smith et al. ................. 423/566 |
| 3,661,518 | 5/1972 | Orahood ..................... 23/137 |
| 4,041,141 | 8/1977 | Moss ......................... 423/571 |
| 4,102,989 | 7/1978 | Wheelock .................... 423/541 |
| 4,309,198 | 1/1982 | Moss ......................... 48/197 |

FOREIGN PATENT DOCUMENTS 1033423 8/1983 U.S.S.R. ..................... 423/566

*Primary Examiner*—Wayne Langel
*Attorney, Agent, or Firm*—Watkins, Dunbar & Pollick

[57] ABSTRACT

A means to increase the reducing potential of natural gas used in the reduction of sulfates such as gypsum. A reducing mixture of natural gas and air (or oxygen) is heated prior to reduction of the sulfate. For gypsum reduction, heating the reducing mixture to 1500° F. (816° C.) prior to gypsum reduction increased the gypsum conversion to calcium sulfide to above 65% at a reactor temperature of 1400°–1500° F. (700°–816° C.) verses less than a 40% conversion rate when an unheated reducing mixture was used.

11 Claims, 3 Drawing Sheets

METHOD FOR IMPROVING REDUCING POTENTIAL OF NATURAL GAS FEED

BACKGROUND OF THE INVENTION

1. Field of the Invention

The present invention relates to a method for the reduction of metal sulfates. More particularly, the invention relates to a process for improving the reducing potential of natural gas used in the reduction of metal sulfates such as gypsum.

2. Background

A wide variety of processes have been developed for the processing of metal sulfates such as gypsum ($CaSO_4$). These processes often focus on the recovery of lime (CaO) and a form of sulfur, typically either elemental sulfur (S) or sulfur dioxide ($SO_2$) with the later often used for the production of sulfuric acid. These processes typically involve the reduction of the metal sulfate to form the metal sulfide as the first step followed by a second oxidation step for conversion of the sulfide to sulfur and/or sulfur dioxide.

The reductive decomposition of calcium sulfate is more fully illustrated by the following equations:

$$CaSO_4 + CO \rightarrow CaO + CO_2 + SO_2 \quad (1)$$

$$CaSO_4 + H_2 \rightarrow CaO + H_2O + SO_2 \quad (2)$$

$$CaSO_4 + 4CO \rightarrow CaS + 4CO_2 \quad (3)$$

$$CaSO_4 + 4H_2 \rightarrow CaS + 4H_2O \quad (4)$$

Equations (1) and (2) are carried out under what is referred to as mildly reducing conditions, that is, a relatively low amount of reducing agent such as carbon monoxide or hydrogen or both. Reactions (1) and (2) require heat, i.e., are endothermic, and are favored by higher reaction temperatures. Reactions (3) and (4) are carried out under strongly reducing conditions, that is, a high amount of reducing agent such as carbon monoxide or hydrogen or both. Reactions (3) and (4) give off heat, i.e., are exothermic, and are favored by lower reaction temperatures.

There have been a large number of efforts to maximize the efficiencies of sulfate reduction including use of either mild (equations (1) and (2)) or strong reducing conditions (equations (3) and (4)). These efforts have been directed to achieving the proper reaction conditions for the selected reaction equations. One of the areas of focus has been in the area of reducing agents used to reduce the sulfate.

A wide variety of reducing gases have been used in a variety of reaction schemes to achieve this result. For example, Foecking, U.S. Pat. No. 3,607,036, relies on the use of a reducing gas and steam to reduce calcium sulfate to the sulfide which in turn reacts with water to form hydrogen sulfide which is also used as a reducing gas for the reduction of the sulfate. The Foecking reducing gases include hydrogen, carbon monoxide, hydrocarbons such as methane, natural gas, and primary reform gas. He obtains primary reform gas by heating water and a gas such as methane to give a composition of about 15 percent carbon monoxide, 6–8 percent carbon dioxide, 0.2–0.3 percent methane, with the remainder being hydrogen. Temperatures in the range of 600°–900° C. (1112°–1652° F.) are used with a temperature of 800°–850° C. (1472°–1562° F.), preferred.

Campbell, U.S. Pat. No. 3,582,276, is directed to obtaining optimal amounts of sulfur dioxide in the reduction step and thus uses a high-temperature environment (2000°–2500° F.; 1093°–1371° C.) and low amounts of reducing gas to favor equations (1) and (2), supra. Campbell uses hydrogen, or carbon monoxide or mixtures of the two such as obtained from the steam reforming of natural gas. He also describes the partial oxidation of natural gas with air as the source of a suitable reducing gas mixture. The reducing gas is prepared in a partial oxidation furnace using air and natural gas to obtain a reducing gas mixture at a temperature of 2,500° F. (1371° C.). Such a temperature favors the formation of calcium oxide and sulfur dioxide in equations (1) and (2), supra.

U.S. Pat. No. 4,102,989 and U.S. Pat. No. 3,607,045 to Wheelock produces calcium oxide and sulfur dioxide from gypsum by simultaneously carrying out both oxidation and reduction actions in the same bed and teaches the in situ combustion of fuels such as coal and natural gas in the bed to produce a reducing environment. Wheelock uses a high temperature environment 1950°–2250° F. (1066°–1232° C.) to favor the reactions in equations (1) and (2). To maximize the heating efficiency of reducing agents such as natural gas, the apparatus is arranged so that separate flows of air and natural gas are maintained to the reaction bed to avoid precombustion.

Orahood, U.S. Pat. No. 3,661,518, is concerned with the recovery of calcium sulfide, itself. To achieve this result, he uses the strongly reducing environment of equations (3) and (4). A reducing medium of reformed methane, i.e., carbon monoxide and hydrogen, and temperatures of 1800° F. (982° C.) are used. Howard et al, U.S. Pat. No. 1,457,436, is concerned with the reduction of metal sulfates to sulfides by burning carbonaceous materials, liquid fuels or a combustible gas in the reaction chamber to produce reducing conditions.

Moss, U.S. Pat. No. 4,041,141, recovers sulfur from sulfur-containing solid fuels, such as coal, by reacting calcium oxide with the sulfur-containing fuels to obtain calcium sulfate and sulfide. He burns natural gas and a limited amount of air in the reactor bed to form mildly reducing conditions according to equations (1) and (2) for the conversion of calcium sulfate to calcium oxide and sulfur dioxide. The reactor bed is about 900°–1350° C. (1652°– 2462° F.) with a temperature of about 1050°–1090° C. (1922°–1994° F.) preferred. The calcium oxide is recycled for further reaction with the sulfur containing fuels.

In summary, it is seen that natural gas has been used under a variety of conditions for sulfate reduction. Excess water has been used with natural gas to liberate hydrogen sulfide from calcium sulfide. Natural gas has been partially burnt to form a high temperature reducing agent that is fed to the sulfate reactor to give the high temperature and mildly reducing conditions of equations (1) and (2). Natural gas also has been partially burnt within the reactor bed to give the high temperatures that promote reaction (1) and (2) through the production of both heat and a reducing environment in the reactor bed. Natural gas has been heated with water to produce reform gas that is used to afford the lower temperatures and stronger reducing conditions of equations (3) and (4). However, no attempt has been made to improve the reducing potential of natural gas itself.

SUMMARY OF THE INVENTION

It is an object of this invention to improve the reducing potential of natural gas as used in the reduction of metal sulfates. This object is achieved through the novel feature of mixing natural gas and an oxygen provider in portions so as to form a reducing mixture and then heating the reducing mixture to increase its reactivity prior to contact with a sulfate that is subsequently reduced with the heated reducing mixture. This feature has the advantage of improving the level of conversion of a sulfate to a sulfide at a given temperature or otherwise allowing the temperature to be lowered for a given sulfate to sulfide conversion level.

As used here, an oxygen provider means air with its usual ratio of oxygen, pure oxygen, or a mixture of the two so as to increase the ratio of oxygen in the air. Preferably, and for cost consideration, air is the preferred oxygen provider.

The oxygen provider and gas are mixed in portions so as to form a reducing mixture. As used here, a reducing mixture is a mixture that when reacted produces at least some carbon monoxide. That is, a deficiency of oxygen is maintained so as to allow at least some carbon monoxide to be formed according to the following equations:

$$CH_4 + 2O_2 \rightarrow CO_2 + 2H_2O \tag{5}$$

$$2CH_4 + 3O_2 \rightarrow 2CO + 4H_2O \tag{6}$$

When an air and natural gas mixture is used, the volume ratio of air to natural gas should be less than about ten to one; preferably a four to one (4:1) air-to-gas ratio is used.

When reducing gypsum ($CaSO_4.2H_2O$) to calcium sulfide, it has been found advantageous to heat the reducing mixture to a temperature of about 1500° F. (816° C.) prior to contact with the gypsum with the actual reduction of the gypsum to calcium sulfide being carried out at about 1400°–1500° F. (760°–816° C.).

The gypsum reduction can be carried out in any suitable reactor, although a fluidized bed reactor is preferred with a bubbling fluidized bed reactor being most preferred. Gaseous by-products from the gypsum reduction may be incinerated and the heat values used to heat the reduction reactor used in reducing the calcium sulfate to sulfide. The air and natural gas are combined and heated using conventional feed, mixing and heating devices prior to their use in the reduction reactor.

The foregoing and other advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

Figure 1:
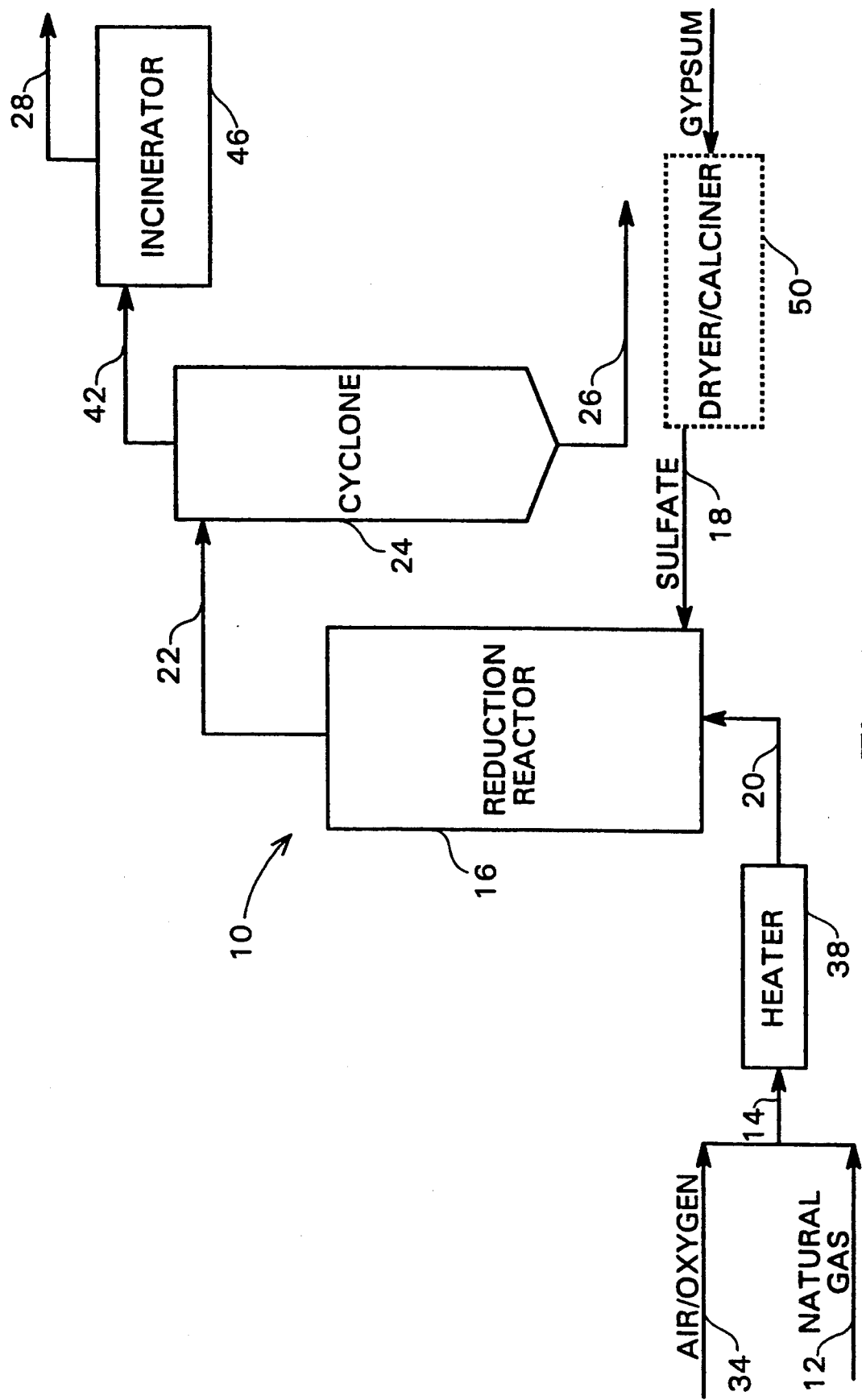
FIG. 1 is a schematic of an embodiment of the apparatus used in the practice of the invention.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

FIG. 1 is an embodiment of the invention that depicts a reduction reactor for recovering metal sulfides from metal sulfates and is indicated generally by the number 10. Calcium sulfate, either in the form of gypsum or anhydrite, is of particular interest because of its wide spread occurrence in large quantities and because of its potential for producing good quality calcium oxide and sulfur dioxide or sulfur. For convenience, the process will be described in detail with reference to the manufacture of calcium sulfide from waste gypsum. However, it is to be understood that other sulfates such as alkali sulfates including sodium sulfate or alkaline earth sulfates such as barium sulfate may be treated in a similar fashion and are considered as equivalents for the purposes of this invention.

Particulate waste gypsum $CaSO_4 2H_2O$ is dried or dehydrated to anhydrite ($CaSO_4$) in a conventional dryer/calciner 50. The anhydrite (sulfate) is fed to a reactor 16 via a feed system 18. In reactor 16, the anhydrite is reduced to CaS by means of a natural gas reducing medium feed to 16 via stream 20. Generally, the sulfate and reducing gas in reactor 16 are heated to a temperature from about 1300° F. (704° C.) to 1800° F. (982° C.) and maintained in the reactor within this temperature range for a period of about 2 seconds to about 30 minutes. The preferred temperature for said reduction reaction is about 1500° F. (816° C.) to about 1600° (871° C.). The product stream 22 leaving the reactor contains CaS as well as the other by-products of the reduction reaction, as outlined in equations (3) and (4), supra as well as the following equations:

$$CaSO_4 + CH_4 \rightarrow CO_2 + 2H_2O + CaS \tag{7}$$

$$CaSO_4 + CO \rightarrow CaSO_3 + CO_2 \tag{8}$$

$$CaSO_4 + H_2 \rightarrow CaSO_3 + H_2O \tag{9}$$

The reducing gas in the reactor 16 is preferably in the ratio of about 10 to 12 SCF per pound (0.624–0.749 m³/kg) of anhydrous $CaSO_4$. This level of reducing gas is considered optimum for processing. Larger quantities of gas may be used but gas in excess of the above levels will not react with the sulfate and thus will impact negatively on the economics of the process. Lower quantities of reducing gas result in some unreacted $CaSO_4$ leaving the reactor, thus reducing overall process efficiency.

The product stream 22 is fed to a separating means, such as a cyclone separator 24, which separates the CaS from the gaseous by-products of the reaction. The gases obtained from the separation step in cyclone 24 exit through stream 42. The gases have a low heat value and may be incinerated such as in incinerator 46, and thereafter, the resulting hot gases in stream 28 used to heat reduction reactor 16 or dryer/calciner 50. The CaS exits the cyclone 24 via stream 26 and after which it may be oxidized with air or other oxidizing agents to give calcium oxide and sulfur dioxide according to methods known in the art. The sulfur dioxide may be reduced to sulfur according to conventional methodology or it may be processed using a combined CaS oxidation and sulfur dioxide reduction system as detailed in the copending Paisley application entitled "Method for the Conversion of Gypsum to Elemental Sulfur" all of which is incorporated by reference as if completely written herein. One of the advantages of a two-stage reactor scheme for $CaSO_4$ reduction and CaS oxidation is that the steps of calcium sulfate reduction and calcium sulfide oxidation are in separate process vessels, thus, eliminating many complexities associated with the prior art combined reduction and oxidation reactions.

A fluidized bed reactor is preferred for reactor 16. By a fluidized bed reactor is meant a reactor system in which gas passes upwardly through a bed of fine particles causing the bed to expand and behave as a fluid. The superficial gas velocity at which this occurs is well defined for a particular system and referred to as the minimum fluidization velocity. A reactor operating between this velocity and the terminal velocity of the particles in the free space above the bed is referred to as a bubbling fluidized bed reactor. Detailed descriptions of fluidized bed systems may be found for example in Kunuii and Levenspiel, *Fluidization Engineering*, Krieger Publishing, 1969, pp. 1–3, which is incorporated herein by reference. A circulating fluidized-bed reactor is one in which the reactor bed is pneumatically conveyed into, through and out of the reactor by a gas stream. Gas velocities in the circulating reactor system must, of necessity, be above the particle terminal velocities. Solids are continuously removed from the top of the reactor and circulated either back to the reduction reactor or on to other reactors.

Air or oxygen or both are provided via stream 34. Natural gas from stream 12 is mixed with air stream 34 and the resulting mixture heated in heater 38 to operating temperature in heater 38. For example, a six inch diameter metal pipe about eighteen inches long was used to heat the air and gas mixture. The pipe can have additional internal baffles to provide additional surface area, e.g., two or three spaced apart concentric inner pipes inserted into pipe heater 38. The pipe heater 38 may be initially heated by igniting the air and gas mixture in heater 38 using a spark or ignition coil. Once the pipe reaches an operating temperature of about 1400°–1600° F. (760°–871° C.) and preferably about 1500° F. (816° C.), the flame is extinguished. The air gas mixture continues to react in a self-sustaining manner as a result of the exothermic reaction of natural gas and air. Alternatively, the gas and air mixture may be heated by applying an external heat source such as a flame or heating coil on the external surface of the pipe heater 38. Once the reaction of air and natural gas commences, the external heating source is no longer necessary and may be removed.

The following examples further illustrate the invention.

EXAMPLE 1

A comparative example was carried out in a six inch diameter fluid bed reactor that was 13 feet high. The bed depth was 18 inches and gas velocities were about 1 foot per second during reaction. The temperature ranged from 1200° (649° C.) to 1600° F. (871° C.) in the fluidized bed reactor. The reactor was used for a first stage reduction using a synthetic medium BTU fuel gas such as might be generated by wood gasification. The gas was fed into the bottom of the reactor 16 to fluidize the sulfate and reduce it to CaS. Typically, the gas was composed of hydrogen, carbon monoxide, methane and ethane as shown in Table I.

TABLE I

| MEDIUM BTU GAS ANALYSIS | |
|---|---|
| Component | Vol. % |
| Hydrogen | 17.76 |
| Carbon Monoxide | 50.09 |
| Carbon Dioxide | 9.88 |
| Methane | 16.76 |
| Ethane | 5.81 |

In addition to the fluid bed reactor, reductions were also run in thermogravimetric analysis (TGA) equipment with small quantities of material. The equipment was arranged to permit the introduction of the reducing gas.

Test results for the conversion of gypsum to CaS, along with results from the fluid bed reactor are shown in Table II. In addition, results from using anhydrite ($CaSO_4$) in place of gypsum ($CaSO_4.2H_2O$) in the reactor are shown.

TABLE II

| GYPSUM CONVERSION TO CALCIUM SULFIDE CORRECTED FOR RAW MATERIAL ANALYSIS (FEED MATERIAL 90% GYPSUM) | | | |
|---|---|---|---|
| Temp. °F. (°C.) | TGA Gypsum | Fluidized Bed Gypsum | Fluidized Bed Anhydrite |
| 1200 (649) | 0.41 | 4.12 | |
| 1400 (760) | 13.23 | | |
| 1450 (788) | | 23.32 | |
| 1475 (802) | | 42.40 | |
| 1480 (804) | | | 90.6 |
| 1485 (807) | | 50.53 | |
| 1485 (807) | | 51.00 | |
| 1500 (816) | 46.40 | | |
| 1510 (821) | | | |
| 1519 (826) | | | 103.76 |
| 1577 (858) | | | 84.5 |
| 1600 (871) | 105.73 | 98.03 | |
| 1800 (982) | 103.40 | | |

It is noted from TGA tests that the yield (CaS conversion) gradually increased over the temperature range from 1400° F. (760° C.) to 1600° F. (871° C.), leveling off at 1600° F. (871° C.) since no further increases were obtained at 1800° F. of (982° C.). Similar results were obtained in the fluid bed reactor from practically no conversion at 1200° F. (649° C.) to 98.03% at 1600° F. (871° C.) again using gypsum as the bed material. For tests with anhydrite, yields were higher at lower temperatures with 100% conversion obtained at temperatures of about 1500° F. (816° C.). Even at 1480°

Figure 2:
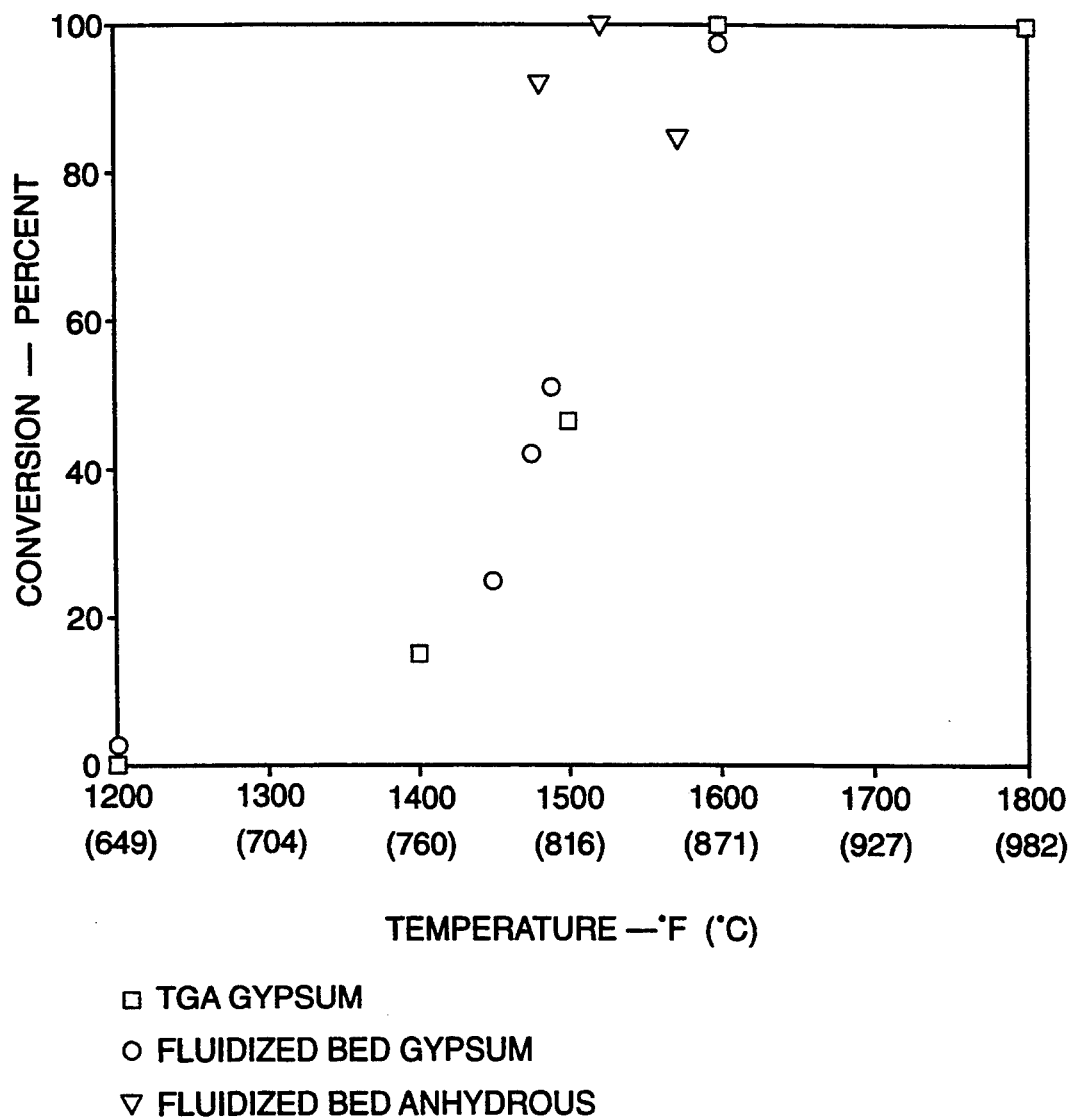
FIG. 2 is a graph of calcium sulfate conversion to calcium sulfide using a synthetic, medium BTU fuel gas generated by wood gasification.

F. (804° C.), a 90% yield was obtained. The results are shown graphically in FIG. 2.

These results provide a comparative example for the conversion of gypsum to CaS over a temperature range of 1400° F. (760° C.) to 1600° (871° C.) with medium BTU gas of the composition representative of a wood gasifier.

EXAMPLE 2

Figure 3:
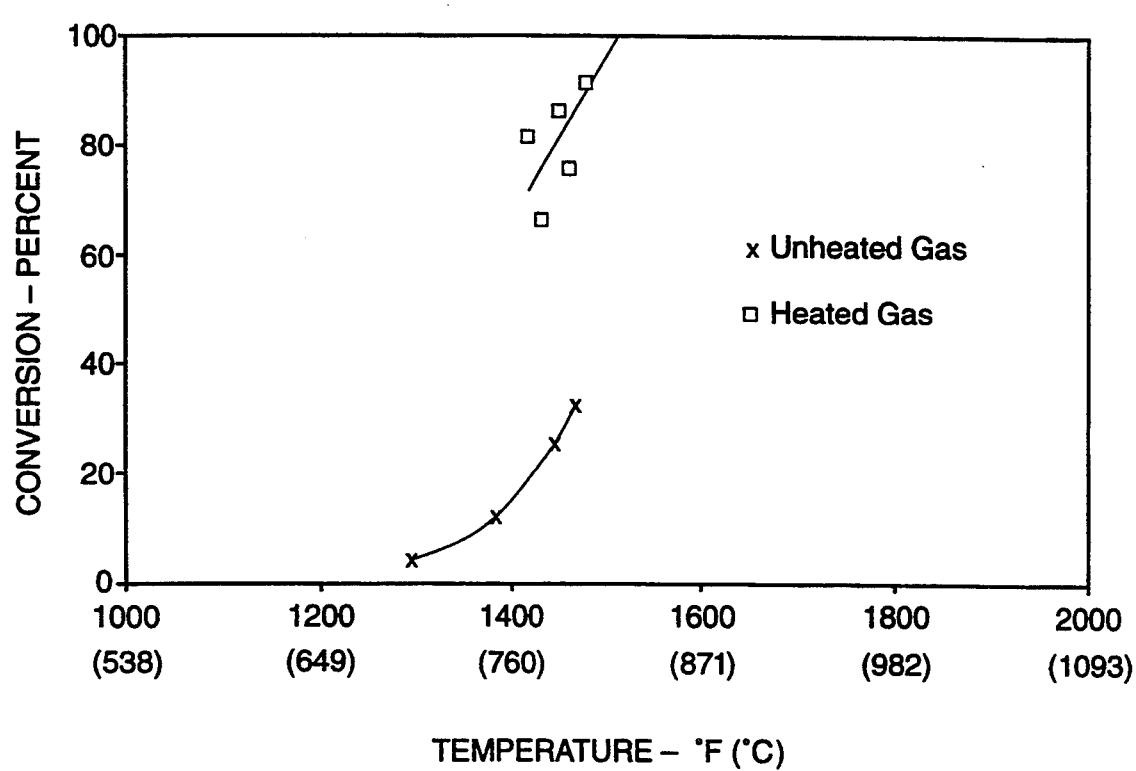
FIG. 3 is a graph of gypsum conversion to calcium sulfide using a heated and unheated mixture of natural gas and air.

As shown in FIG. 3, when unheated raw natural gas and air in a 1:4 volume ratio were used as the reducing agent, relatively low levels of gypsum to sulfide conversion were obtained, i.e., less than 40% conversion at temperatures of 1400°-1500° F. (760°-816° C.). However, when the natural gas was mixed with air and heated to a temperature of about 1500° F. (816° C.) and as shown in FIG. 3, an unexpected and dramatic increase in the conversion of gypsum to sulfide occurred, i.e., 60-95% conversion at 1400°-1500° F. (760°-816° C.). This result is thought to be caused by an initial breakdown of natural gas and reaction with air and oxygen to form more reactive species.

It is to be understood that although the present invention has been specifically disclosed with the preferred embodiment and examples, modifications to the experimental design may be apparent to those skilled in the art and such modifications and variations are considered to be within the scope of the invention and the appended claims. It is also intended that all matter contained in the above description shall be interpreted as illustrative and not in a limiting sense, the scope of the invention being indicated by the appended claims rather than by the foregoing description, and all changes that come within the meaning and range of equivalency of the claims are therefore intended to be embraced therein. That is, the following claims are intended to cover all of the generic and specific features of the invention herein described, and all statements of the scope of the invention which, as a matter of language, fall therebetween. Furthermore, it is to be understood that in the following claims, ingredients or compounds recited in the singular are intended to include compatible mixtures of such ingredients wherever the sense permits.

We claim:

1. A process for improving the reducing potential of natural gas used in the reduction of sulfate comprising the steps of:

a) mixing natural gas and an oxygen provider in portions so as to form a reducing mixture consisting essentially of said natural gas and said oxygen provider, b) heating said reducing mixture to a temperature of about 1400°-1600° F. so as to increase the reactivity of said mixture prior to contact with said sulfate, and c) reducing said sulfate to sulfide with said reducing mixture previously heated to said temperature of about 1400°-1600° F.

2. The process for improving the reducing potential of natural gas according to claim 1 wherein said oxygen provider is air.

3. The process for improving the reducing potential of natural gas according to claim 2 wherein the volume of said air is less than about ten times the volume of natural gas.

4. The process for improving the reducing potential of natural gas according to claim 3 wherein the volume of said air is about four times the volume of said natural gas.

5. The process for improving the reducing potential of natural gas according to claim 1 wherein said sulfate is calcium sulfate.

6. The process for improving the reducing potential of natural gas according to claim 5 wherein said calcium sulfate is gypsum.

7. The process for improving the reducing potential of natural gas according to claim 6 wherein said reducing mixture is heated to a temperature of about 1500° F. (816° C.).

8. The process for improving the reducing potential of natural gas according to claim 6 wherein said reducing of said gypsum with said reducing mixture is carried out at 1300°-1800° F. (704°-982° C.).

9. The process for improving the reducing potential of natural gas according to claim 8 wherein said reducing of said gypsum is carried out at 1500°-1600° F. (816°-871° C.).

10. The process for improving the reducing potential of natural gas according to claim 8 wherein said reducing of said gypsum with said reducing mixture is carried out in a fluidized bed reactor.

11. The process for improving the reducing potential of natural gas according to claim 10 wherein said reducing of said gypsum with said reducing mixture is carried out in a bubbling fluidized bed reactor.

* * * * *